US011284338B2

(12) United States Patent
Garcia Rodriguez et al.

(10) Patent No.: US 11,284,338 B2
(45) Date of Patent: Mar. 22, 2022

(54) HIDDEN NODE DISCOVERY FOR MULTIPLE-INPUT-MULTIPLE-OUTPUT (MIMO) IN UNLICENSED FREQUENCY BANDS

(71) Applicant: Alcatel Lucent, Nozay (FR)

(72) Inventors: Adrian Garcia Rodriguez, Dublin (IE); Giovanni Geraci, Dublin (IE); David Lopez-Perez, Dublin (IE); Lorenzo Galati Giordano, Dublin (IE)

(73) Assignee: Alcatel Lucent, Nozay (FR)

( * ) Notice: Subject to any disclaimer, the term of this patent is extended or adjusted under 35 U.S.C. 154(b) by 328 days.

(21) Appl. No.: 16/493,779

(22) PCT Filed: Mar. 14, 2018

(86) PCT No.: PCT/IB2018/000562
§ 371 (c)(1),
(2) Date: Sep. 13, 2019

(87) PCT Pub. No.: WO2018/167576
PCT Pub. Date: Sep. 20, 2018

(65) Prior Publication Data
US 2021/0289428 A1    Sep. 16, 2021

Related U.S. Application Data

(60) Provisional application No. 62/473,121, filed on Mar. 17, 2017.

(51) Int. Cl.
*H04W 16/14*       (2009.01)
*H04W 48/16*       (2009.01)
(Continued)

(52) U.S. Cl.
CPC .......... *H04W 48/16* (2013.01); *H04B 7/0413* (2013.01); *H04W 16/14* (2013.01); *H04W 74/0808* (2013.01)

(58) Field of Classification Search
CPC . H04W 48/16; H04W 16/14; H04W 74/0808; H04B 7/0413
See application file for complete search history.

(56) References Cited

U.S. PATENT DOCUMENTS 7,945,263 B2 *   5/2011   Noll ................. H04W 36/0055
                                                       455/436
8,995,416 B2 *   3/2015   Harel ................ H04W 74/0816
                                                       370/338

(Continued)

FOREIGN PATENT DOCUMENTS

EP    3310013 A1    4/2018
EP    3331304 A1    6/2018

OTHER PUBLICATIONS

Geraci et al., "Operating Massive MIMO in Unlicensed Bands for Enhanced Coexistence and Spatial Reuse", IEEE Journal on Selected Areas in Communications, vol. 35, No. 6, Jun. 2017, pp. 1282-1293.

(Continued)

*Primary Examiner* — Dai Phuong
(74) *Attorney, Agent, or Firm* — Alcatel Lucent

(57) ABSTRACT

A base station for a multiple-input, multiple-output (MIMO) array receives a message that includes information identifying the transmitting and receiving nodes. Based on whether the base station has access to up-to-date channel covariance matrices for the nodes, the base station selectively performs a clear channel assessment in an unlicensed frequency band concurrently with placing nulls in directions associated with the nodes. In some cases, the up-to-date channel covariance matrices are used to place nulls in the directions associated with the nodes concurrently with performing the clear channel assessment in response to the up-to-date channel covariance matrices being available to the base station. Placement of nulls in the directions asso- (Continued)

ciated with the nodes is bypassed in response to the up-to-date channel covariance matrices not being available to the base station.

20 Claims, 6 Drawing Sheets

(51) Int. Cl.
*H04B 7/0413* (2017.01)
*H04W 74/08* (2009.01)

(56) References Cited

U.S. PATENT DOCUMENTS

| | | |
|---|---|---|
| 9,562,968 B2* | 2/2017 | Wu .................. G01S 13/726 |
| 10,069,575 B1 | 9/2018 | Garcia Rodriguez et al. |
| 10,219,274 B2* | 2/2019 | Wang ................ H04W 72/0453 |
| 10,257,831 B2 | 4/2019 | Geraci et al. |
| 2003/0185285 A1* | 10/2003 | Talwar ................ H04B 7/0842 |
| | | 375/148 |
| 2013/0012134 A1* | 1/2013 | Jin ...................... H04B 7/0845 |
| | | 455/62 |
| 2016/0212735 A1* | 7/2016 | Nogami ................ H04L 5/0048 |
| 2019/0075592 A1* | 3/2019 | Li ......................... H04W 24/02 |

OTHER PUBLICATIONS

Geraci et al., "Enhancing Coexistence in the Unlicensed Band with Massive Mimo", IEEE International Conference on Communications (ICC), May 21-25, 2017, 6 pages.

International Search Report and Written Opinion received for corresponding Patent Cooperation Treaty Application No. PCT/IB2018/000562, dated Aug. 7, 2018, 10 pages.

\* cited by examiner

HIDDEN NODE DISCOVERY FOR MULTIPLE-INPUT-MULTIPLE-OUTPUT (MIMO) IN UNLICENSED FREQUENCY BANDS

RELATED APPLICATION

This application was originally filed as Patent Cooperation Treaty Application No. PCT/IB2018/000562 filed Mar. 14, 2018, which claims priority benefit to U.S. Provisional Patent Application No. 62/473,121, filed Mar. 17, 2017.

BACKGROUND

Unlicensed frequency bands are portions of the radiofrequency spectrum that do not require a license for use and may therefore be used by any device compliant with regulations to transmit or receive radiofrequency signals. Wireless communication devices that transmit or receive signals in licensed or unlicensed frequency bands are typically referred to as nodes, which include Wi-Fi access points that operate according to IEEE 802.11 standards in the unlicensed spectrum. Nodes also include base stations that operate in the licensed spectrum according to standards such as Long Term Evolution (LTE) standards defined by the Third Generation Partnership Project (3GPP). Base stations that operate according to LTE can implement supplementary downlink (SDL) channels in the unlicensed spectrum to provide additional bandwidth for downlink communications to user equipment that are also communicating with the base station using channels in a licensed frequency band. The licensed frequency bands may be referred to as LTE-L bands and the unlicensed frequency bands may be referred to as LTE-U bands. Other base stations operate in the unlicensed frequency bands according to Licensed Assisted Access (LAA) standards. Some base stations operate solely in the unlicensed frequency bands without support in licensed frequency bands, e.g., according to emerging standards such as MuLTEFire. Demand for the unlicensed frequency bands is growing and guaranteeing seamless inter-technology coexistence is essential to support the broad range of technologies operating in the unlicensed frequency bands. Access to the unlicensed frequency band is therefore strictly regulated and nodes operating within the unlicensed frequency bands must comply with well-defined regulatory requirements.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
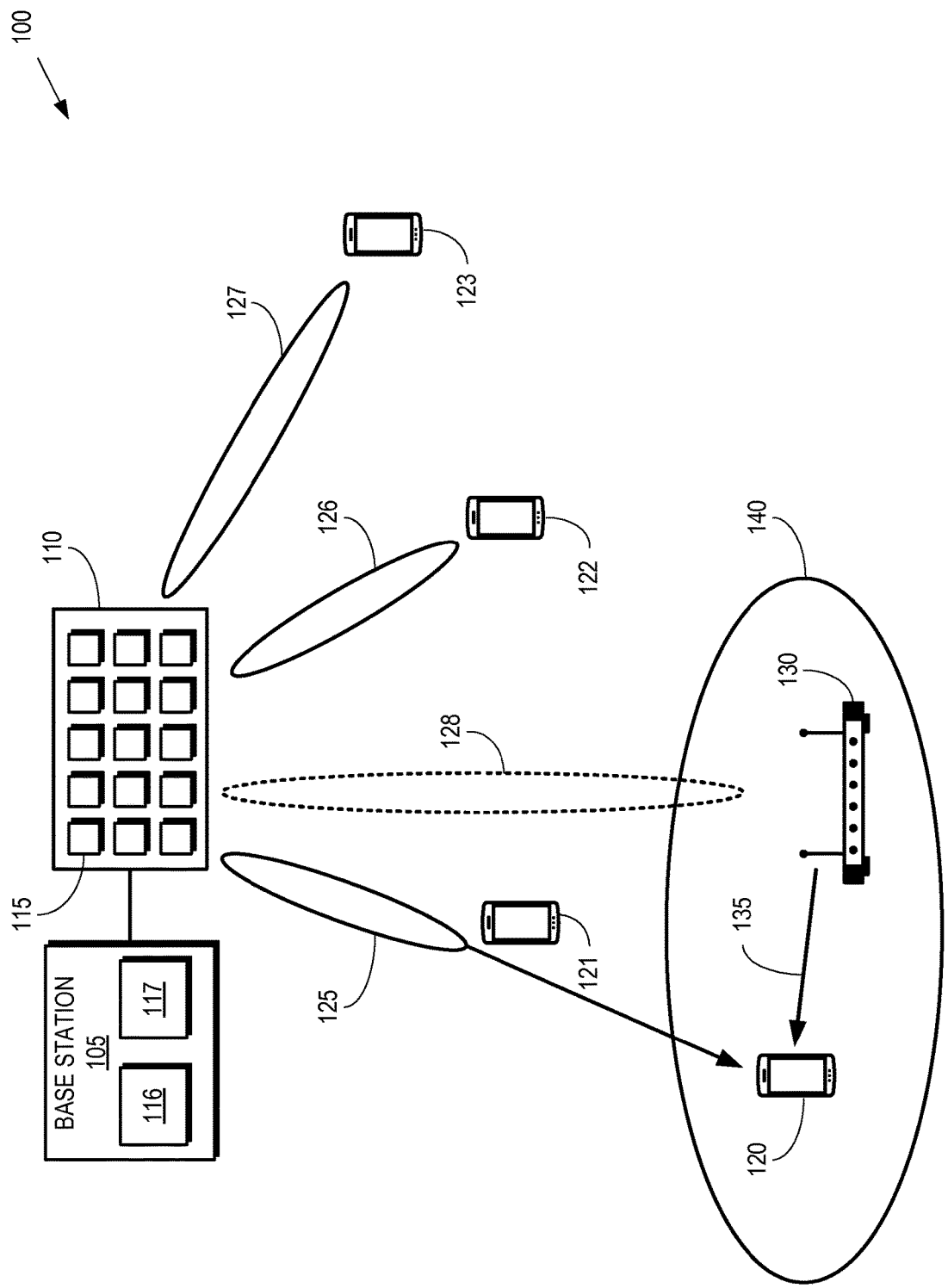
FIG. 1 is a block diagram of a wireless communication system that includes a base station that provides wireless connectivity via a multiple-input, multiple-output (M IMO) array according to some embodiments.

In dense networks, channels in the unlicensed frequency bands are reused by nodes that operate according to different radio access technologies (RATs) such as Wi-Fi access points and LTE base stations. Communication by the nodes that operate according to the different RATs is coordinated using clear channel assessment techniques to reduce interference between transmissions by the different nodes. For example, listen-before-talk (LBT) coexistence rules require that each node monitors a channel (e.g., "listens") to detect energy on the channel prior to transmitting information on the channel. If the detected energy level is below a threshold level, the channel is considered clear and the node is free to transmit on the channel for a predetermined time interval. If the detected energy level is above the threshold level, which indicates that the channel is not clear because another node is transmitting on the channel, the listening node backs off until the energy level falls below the threshold. However, conventional coexistence schemes are based on discontinuous transmission and do not allow concurrent usage of the unlicensed frequency bands by different technologies with overlapping coverage areas. Thus, the conventional approach is likely to be suboptimal in densely deployed scenarios and prevent the attainment of high data rates.

Multiple-input, multiple-output (M IMO) arrays include large number of antennas to provide a large number of spatial degrees of freedom that support spatially multiplexed communication with multiple user equipment. For example, a massive MIMO array of N antennas can provide a spatially multiplexed channel to each of K user equipment as long as N≥K. Additional spatial degrees of freedom may be allocated to interference suppression to improve coexistence with other transmitters, such as interfering Wi-Fi nodes. For example, interference with D single-antenna interfering nodes can be suppressed by allocating at least D degrees of freedom to spatial nulls that are placed onto spatial directions corresponding to the D interfering nodes, where D≤N−K. Massive MIMO arrays are therefore able to place radiation nulls to suppress interference along directions towards other nodes during data transmission and during mandatory LBT phases. A node that implements a massive MIMO array with interference suppression becomes "invisible" to the nodes that have been nulled and does not interfere with the nulled nodes, thereby resulting in a larger reuse of the unlicensed frequency bands.

In order to place the nulls, nodes that include a massive MIMO array may periodically interrupt their own transmission to "listen" for transmission by other active nodes during a listening time interval. The node then calculates one or more dominant eigendirections of a channel subspace occupied by other nearby nodes using channel covariance estimation based on signals received during the listening time interval. However, not all of the nodes that are subject to interference from the massive MIMO array are expected to be transmitting frequently enough to be detected during the listening time interval. For example, user equipment that are receiving downlink-only transmission from an access point, such as Wi-Fi or SDL transmissions, transmit infrequently or not at all while receiving the downlink-only transmission. The node that includes the massive MIMO array is unable to detect interfering transmissions from the "hidden" user equipment and the channel covariance estimation technique will not identify a direction to the hidden user equipment as one of the dominant eigendirections of the channel subspace. Thus, a null will not be placed on the direction corresponding to the hidden user equipment. The hidden user equipment is therefore subject to interference from the massive MIMO array because the massive MIMO array does not receive energy from the nulled access point during the listening time interval and, consequently, the massive MIMO array is able to transmit concurrently with downlink transmissions from the access point. Since the massive MIMO array does not place a null on the hidden user equipment, transmission from the massive MIMO array interferes with the downlink-only transmission from the access point.

FIGS. 1-6 disclose techniques for reducing or avoiding interference at a hidden node in a wireless communication system that includes a MIMO array configured to transmit in an unlicensed frequency band. A base station for the MIMO array identifies transmitting nodes and receiving nodes based on information included in messages received by the massive MIMO array in the unlicensed frequency band. The massive MIMO array selectively performs a clear channel assessment (e.g., listen-before-talk, LBT) concurrently with placing nulls in directions associated with the neighboring nodes depending on whether the massive MIMO array has access to up-to-date channel covariance matrices for the neighboring nodes. If up-to-date channel covariance matrices are available for the neighboring nodes, the channel covariance matrices are used to place nulls in the directions associated with the neighboring nodes concurrently with performing the clear channel assessment. If up-to-date channel covariance matrices are not available for the neighboring nodes, the massive MIMO array does not place nulls in the directions associated with the neighboring nodes. Some embodiments of the massive MIMO array perform an omni-directional clear channel assessment, i.e., a clear channel assessment that is performed without placing nulls on directions associated with interfering nodes, if one or more up-to-date channel covariance matrices are not available. Per-user channel covariance matrices are generated by independently aggregating symbols transmitted by different nodes, e.g., on the basis of the information identifying the transmitting node in a header of a message including the symbols. The aggregated symbols for each node are then used to generate the corresponding per-user channel covariance matrix.

FIG. 1 is a block diagram of a wireless communication system 100 that includes a base station 105 that provides wireless connectivity via a MIMO array 110 according to some embodiments. The MIMO array 110 includes a plurality of antenna elements 115, only one indicated by a reference numeral in the interest of clarity. Transmission and reception by the plurality of antenna elements 115 is coordinated by the base station 105, which provides modulated baseband signals to the antenna elements 115 for transmission over an air interface and receives modulated baseband signals from the antenna elements 115. The base station 105 demodulates and decodes the received signals and provides the information in the decoded signals to other entities (not shown) in the wireless communication system 100, e.g., using one or more processors 116 that execute instructions stored in one or more memories 117. The base station 105 and the MIMO array 110 are also referred to collectively as a node of the wireless communication system 100. However, the term "base station" will be used herein to refer to the processors, memories, and other circuitry used to generate baseband signals for transmission by the MIMO array 110 and receive baseband signals from the MIMO array 110.

The base station 105 is configured to exchange signals with the user equipment 120, 121, 122, 123 (collectively referred to herein as "the user equipment 120-123") in licensed or unlicensed frequency bands. Some embodiments of the base station 105 are therefore configured to operate in the licensed spectrum according to standards such as Long Term Evolution (LTE) standards defined by the Third Generation Partnership Project (3GPP). Some embodiments of the base station 105 also implement supplementary downlink (SDL) channels in the unlicensed spectrum to provide additional bandwidth for downlink communications to the user equipment 120-123. The base station 105 provides control signaling to the user equipment 120-123 for the SDL channels in a licensed frequency band. The licensed frequency bands are referred to as LTE-L bands and the unlicensed frequency bands are referred to as LTE-U bands. Some embodiments of the base station 105 operate in the unlicensed frequency bands according to Licensed Assisted Access (LAA) standards. Some embodiments of the base station 105 operate solely in the unlicensed frequency bands without support in licensed frequency bands, e.g., according to emerging standards such as MuLTEFire.

In order to support coexistence with other entities in the wireless communication system 100, the base station 105 performs a clear channel assessment (CCA) prior to transmitting in the unlicensed frequency band. Some embodiments of the base station 105 perform a listen-before-talk (LBT) operation to detect energy on a channel in the unlicensed frequency band prior to transmitting information on the channel. If the base station 105 detects an energy level on the channel that is below a threshold level, the channel is considered clear and the base station 105 is free to transmit on the channel for a predetermined time interval. If the detected energy level is above the threshold level, which indicates that the channel is not clear because another node is transmitting on the channel, the base station 105 backs off until the energy level falls below the threshold. The energy detection threshold for Wi-Fi is −62 decibel-milliwatts (dBm) and the energy detection threshold for LTE-U, LAA is −72 dBm, and MuLTEFire is −72 dBm. Wi-Fi nodes may also perform Wi-Fi preamble decoding on signals with detected energy levels below the energy detection threshold and above −82 dBm. The Wi-Fi node backs off if it successfully decodes preambles in transmissions by other Wi-Fi nodes at an energy level between −62 dBm and −82 dBm.

The base station 105 utilizes the spatial degrees of freedom of the MIMO array 110 to create spatial channels 125, 126, 127 (collectively referred to herein as "the spatial channels 125-127") along one or more directions, such as the directions from the MIMO array 110 towards the user equipment 121-123. The base station 105 is also able to use available spatial degrees of freedom of the MIMO array 110 to create spatial nulls 128 (as indicated by the dashed oval) along directions towards potentially interfering devices such as the access point 130. The MIMO array 110 transmits substantially no energy along a direction associated with the spatial null 128 and the reception sensitivity of the MIMO array 110 is small or zero along the direction associated with the spatial null 128. The MIMO array 110 and the access point 130 are therefore substantially invisible to each other and do not interfere with each other. Techniques for generating spatial channels or spatial nulls, such as precoding or beamforming, are known in the art and in the interest of clarity are not discussed in detail herein.

If the base station 105 has detected the presence of the access point 130, the base station 105 uses the covariance matrix associated with the access point 130 to form the spatial null 128. The base station 105 is then able to perform the LBT operation for subsequent transmissions using the spatial null 128 to filter out signals received from the access point 130. Thus, signals transmitted by the access point 130 do not contribute to the energy detected by the base station 105 during the LBT operation. Since the signals transmitted by the access point 130 do not contribute to the received energy detected during LBT, the base station 105 is able to transmit concurrently with the access point 130 on the same channel of the unlicensed frequency band. However, in the illustrated embodiment, the base station 105 is unaware of the presence of the user equipment 120, e.g., because the base station 105 has not detected any signals transmitted by the user equipment 120. The access point 130 transmits downlink signals 135 to the user equipment 120, which is in a cell 140 served by the access point 130. Signals transmitted from the MIMO array 110 therefore interfere with signals received by the user equipment 120. For example, the spatial channel 125 is oriented along a direction towards both the user equipment 120 and the user equipment 121 so that transmissions towards the user equipment 121 interfere with the downlink signals 135 transmitted from the access point 130 to the user equipment 120.

To address this hidden node problem, the base station 105 uses information in messages transmitted by the access point 130 to identify hidden nodes such as the user equipment 120. The information in the messages includes information identifying a transmitting node, such as an address of the access point 130, and information identifying a receiving node for the message such as an address of the user equipment 120. The base station 105 then selectively performs a CCA operation (such as LBT) based on whether the base station 105 has access to up-to-date channel covariance matrices for the user equipment 120 and the access point 130. The CCA operation is performed concurrently with placing the spatial null 128 in the direction of the access point 130 if the base station 105 has access to the up-to-date channel covariance matrices.

If the base station 105 does not have access to the up-to-date channel covariance matrices, e.g., because the base station 105 has not received any messages from the user equipment 120, the base station 105 bypasses the CCA operation and instead listens for subsequent messages transmitted by the hidden node. For example, the base station 105 can listen for acknowledgment messages transmitted by the user equipment 120 in response to downlink messages received from the access point 130. Once the base station 105 has acquired sufficient aggregated energy in messages received from the hidden node, e.g., the user equipment 120, the base station 105 is able to generate one or more additional spatial nulls (not shown in FIG. 1) along directions toward the hidden nodes such as the user equipment 120. The base station 105 then performs the CCA operation to acquire channels of the unlicensed frequency band using the spatial null 128 and any additional spatial nulls to filter energy received from the corresponding nodes. The base station 105 also transmits on the acquired channels of the unlicensed frequency band using the spatial null 128 and any additional spatial nulls to avoid interfering with transmissions involving the user equipment 120 or the access point 130.

Figure 2:
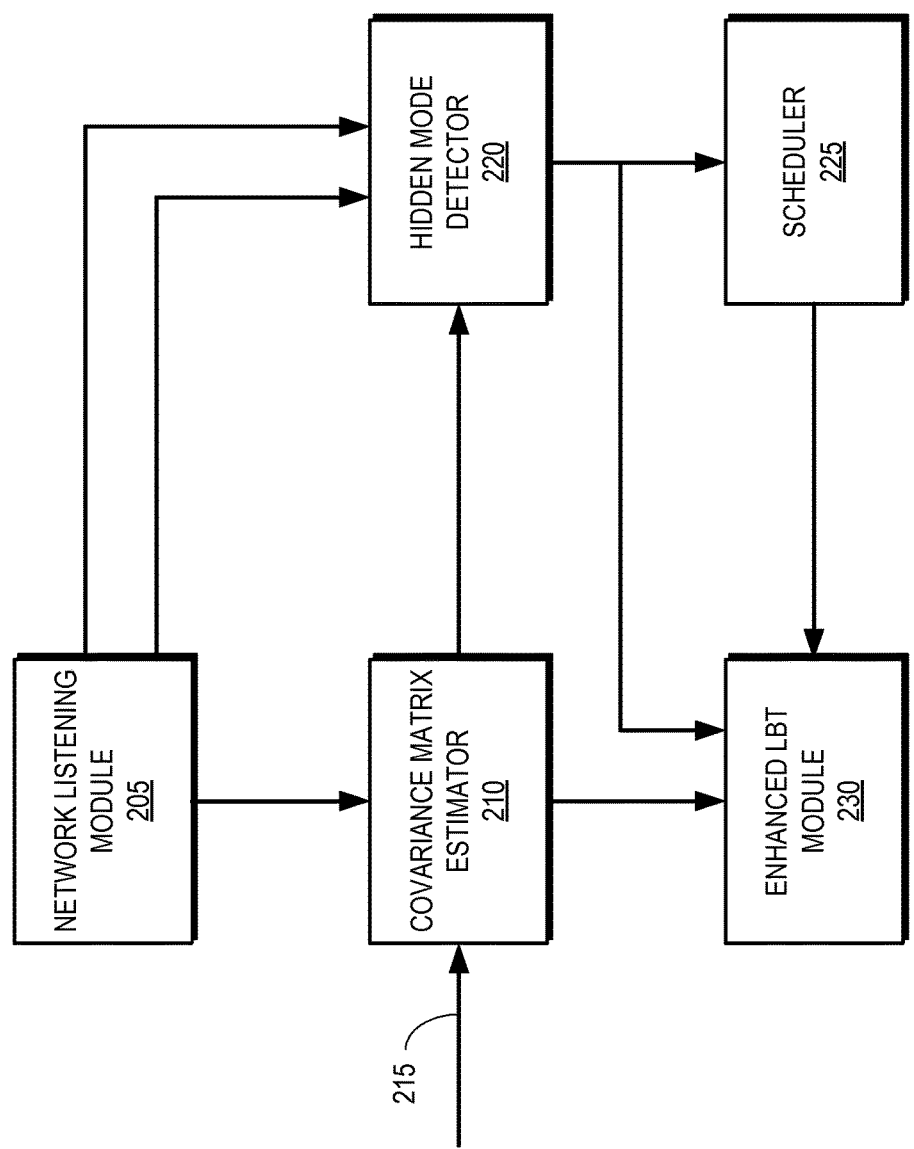
FIG. 2 is a block diagram of a base station that selectively performs clear channel assessment (CCA) operations based on the availability of channel covariance matrices according to some embodiments.

FIG. 2 is a block diagram of a base station 200 that selectively performs CCA operations based on the availability of channel covariance matrices according to some embodiments. The base station 200 is used to implement some embodiments of the base station 105 shown in FIG. 1. The entities in the base station 200 illustrated in FIG. 2 are implemented using one or more processors, memories, and transceivers, which are implemented using separate transmitters and receivers or an integrated transmitter/receiver.

The base station 200 includes a network listening module (NLM) 205 that is configured to capture and decode headers in data packets received by a MIMO array such as the MIMO array 110 shown in FIG. 1. The NLM 205 is able to decode packets in multiple technologies that are operating in an unlicensed frequency band, such as Wi-Fi, other IEEE 802 technologies, LTE-U, and the like. The NLM 205 identifies neighboring nodes using information in the decoded headers of the data packets or messages. Some embodiments of the NLM 205 extract medium access control (MAC) addresses of a transmitting node and a receiving node from the decoded header. Thus, the NLM 205 is able to identify hidden nodes. For example, the base station 200 is not able to detect a user equipment that is receiving downlink transmission from a Wi-Fi access point if the Wi-Fi access point is transmitting downlink information to the user equipment and the user equipment is not transmitting uplink traffic or the user equipment is only sporadically transmitting uplink traffic such as acknowledgment messages. However, the headers of frames transmitted by the Wi-Fi access point to the user equipment include the MAC address of the user equipment (i.e., the receiving node). Thus, the NLM 205 is able to determine that the user equipment is a hidden node in the area served by the base station 200 based on the addresses in the messages transmitted by the Wi-Fi access point.

A covariance matrix estimator 210 in the base station 200 receives information identifying the transmission node of the message received by the NLM 205. The covariance matrix estimator 210 also receives the baseband symbols 215 that are received in the message. The covariance matrix estimator 210 uses the identity of the transmission node and the corresponding baseband symbols 215 to generate a channel covariance matrix for the transmission node. The covariance matrix estimator 210 is therefore able to generate per-user channel covariance matrices for nodes that are detected by the NLM 205 using messages transmitted by these nodes, as discussed herein. The channel covariance matrices generated by the covariance matrix estimator 210 are used to determine whether up-to-date channel matrices are available for individual nodes. The channel covariance matrices are also used to isolate data traffic dynamics when placing spatial nulls on directions associated with nodes that neighbor the base station 200. Some embodiments of the covariance matrix estimator 210 implement the method 300 shown in FIG. 3.

The NLM 205 also provides information identifying the transmitting and receiving nodes to a hidden node detector 220. Some embodiments of the NLM 205 provide MAC addresses of the transmitting and receiving nodes that have been extracted from a header of a message transmitted by the transmitting node. The hidden node detector 220 also receives information identifying the per-user channel covariance matrices generated by the covariance matrix estimator 210. The hidden node detector 220 uses this information to determine whether a hidden node potentially exists in the neighborhood of the base station 200. The hidden node detector 220 maintains tables including the identities of transmitting and receiving nodes that have been identified by the NLM 205 and a status of covariance matrices associated with the nodes listed in the table. The status indicates whether an up-to-date covariance channel matrix is available for the corresponding node. Some embodiments of the hidden node detector 220 implement the method 400 shown in FIG. 4.

A scheduler 225 is configured to schedule user equipment for communication with the base station 200. Some embodiments of the scheduler 225 schedule the user equipment based on information indicating whether a hidden node is present, such as a hidden node detection flag provided by the hidden node detector 220, as discussed below. The scheduler 225 provides requests to perform a CCA operation to identify clear channels to a module that is configured to perform the CCA operation. In the illustrated embodiment, the base station 200 includes an enhanced LBT module 230 for performing CCA operations to identify clear channels in an unlicensed frequency band.

The enhanced LBT module 230 receives requests from the scheduler 225, as well as per-user covariance matrices from the covariance matrix estimator 210 and hidden node detection flags from the hidden node detector 220. The enhanced LBT module 230 performs energy detection and determines whether channels of the unlicensed frequency band are free. Some embodiments of the enhanced LBT module 230 perform the CCA operation concurrently with placing a spatial null towards nodes that have up-to-date channel covariance matrices and share the same unlicensed frequency band. The availability of per-user channel covariance matrices allows the enhanced LBT module 230 to place the spatial nulls onto the individual dominant eigendirections of the different nodes. Compared to conventional techniques that utilize a single aggregate channel covariance matrix for all neighboring nodes detected by the base station 200, utilizing the per-user channel covariance matrices guarantees coexistence fairness towards all neighboring nodes, irrespective of their traffic activity. The enhanced LBT module 230 aborts or bypasses transmission in response to detecting a hidden node, e.g., if a hidden node detection flag is active. Aborting or bypassing transmissions in response to detecting hidden nodes ensures fair coexistence with neighboring nodes that share the same unlicensed frequency band concurrently with placing dynamic spatial nulls. Some embodiments of the enhanced LBT module 230 implement the method 500 shown in FIG. 5.

In some cases, the hidden nodes identified by the hidden node detector 220 are not neighboring nodes to the base station 200, e.g., one or more of the hidden nodes is outside the coverage area of the base station 200. Transmissions from the base station 200 are not likely to interfere with nodes that are outside the coverage area and so the overall performance of the network is not improved by forcing the base station 200 to bypass CCA operations or transmissions due to the presence of an out of reach hidden node. Some embodiments of the covariance matrix estimator 210 are therefore configured to ignore indications of a hidden node when the covariance matrix estimator 210 determines that the hidden node is outside the coverage area of the base station 200. Some embodiments of the base station 200 employ a counter or a timer that is initiated in response to detecting a hidden node. The base station 200 categorizes the hidden node as out of reach if the counter reaches a threshold value, or the timer exceeds a predetermined time limit, before the base station 200 detects any transmissions from the hidden node. The covariance matrix estimator 210 ignores the channel covariance matrices of the out of reach nodes when activating or deactivating corresponding hidden node detection flags.

Some embodiments of the NLM 205 are able to decode messages transmitted in other technologies (e.g., Wi-Fi signals) concurrently with the base station 200 performing data transmission via the MIMO array. For example, the NLM 205 can be implemented using an independent physical system (e.g., antennas, radiofrequency chains, and the like) if the antennas have orthogonal polarizations or if the base station 200 implements a full-duplex system that mitigates self-interference. The base station 200 is therefore able to detect new transmission in the other technologies concurrently with transmission during a downlink data stage. Transmission is aborted or bypassed if a hidden node problem is detected.

Figure 3:
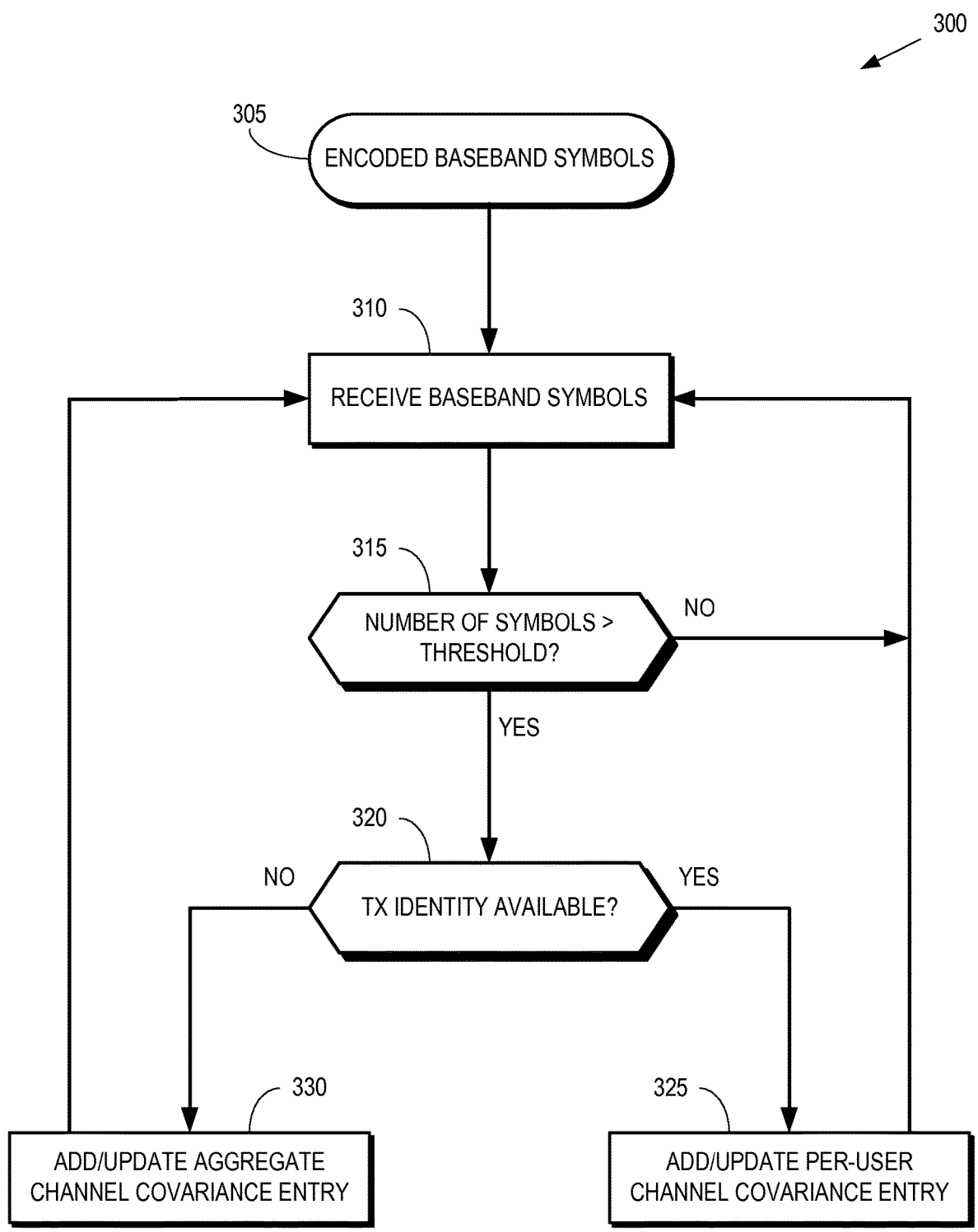
FIG. 3 is a flow diagram of a method of estimating channel covariance matrices according to some embodiments.

FIG. 3 is a flow diagram of a method 300 of estimating channel covariance matrices according to some embodiments. The method 300 is implemented in a base station for a MIMO array such as some embodiments of the base station 105 shown in FIG. 1 and the channel covariance estimator 210 in the base station 200 shown in FIG. 2.

The base station monitors an air interface during a listening time interval. At block 310, the base station receives baseband symbols over the air interface during the listening time interval.

At decision block 315, the base station determines whether a sufficient number of baseband symbols have been received to produce an accurate estimation of a channel covariance matrix. Some embodiments of the base station determine whether a sufficient number of the baseband symbols have been received by comparing the number of received baseband symbols to a threshold value. The threshold value is a total number of received baseband symbols if the base station is generating an aggregate channel covariance matrix associated with all the neighboring nodes. The threshold value is a number of received baseband symbols associated with a particular neighboring node if the base station is generating per-user channel covariance matrices. Thus, some embodiments of the method 300 are performed multiple times to generate per-user channel covariance matrices for each of the neighboring nodes that have been identified, e.g., by the hidden node detector 220 shown in FIG. 1. If an insufficient number of baseband symbols have been received, the method 300 flows back to block 310 and the base station continues to collect more baseband symbols. If a sufficient number of baseband symbols have been received, the method 300 flows to decision block 320.

At decision block 320, the base station determines whether an identity of a transmitting node is available. In some embodiments, the identity of the transmitting node is determined using a MAC address that is extracted from a header of a message transmitted by the transmitting node and received by the base station. For example, the message can be a data message transmitted by a Wi-Fi access point. For another example, the message can be an acknowledgment message transmitted by a user equipment in response to the data message transmitted by the Wi-Fi access point. If the identity of the transmitting node is available, the method 300 flows to block 325. If the identity of the transmitting node is not available, the method 300 flows to the block 330.

At block 325, the channel covariance matrix estimator implemented in the base station updates the per-user channel covariance matrix for the transmitting node based on the received symbols. The per-user channel covariance matrix is therefore an up-to-date channel covariance matrix. A table implemented in the base station is updated to indicate that the channel covariance matrix for the transmitting node is up-to-date. The channel covariance matrix is considered up-to-date for a predetermined time interval following estimation of a per-user channel covariance matrix for the transmitting node. If no additional baseband symbols are received from the transmitting node prior to the predetermined time interval elapsing, the channel covariance matrix is reclassified as out of date. In response to the reclassification, the table is updated to indicate that the channel covariance matrix for the transmitting node is no longer up-to-date.

At block 330, the channel covariance matrix estimator implemented in the base station estimates an aggregate channel covariance matrix because the base station is not able to associate the received symbols with a transmitting node. Even though the symbols are not used to update the per-user channel covariance matrices, the received symbols contain useful information about locations of neighboring nodes, which can be used to generate spatial beams or spatial nulls associated with the neighboring nodes.

In contrast to generating an aggregate channel covariance matrix, generating per-user channel covariance matrices helps to isolate traffic dynamics because the number of baseband symbols collected per device is weighted by the transmission time for the baseband symbols. For example, the weight applied to each transmitting node depends on their radiofrequency distance to the base station for the MIMO array. An aggregate channel covariance matrix estimation may skew the significance channel eigendirections towards those transmitting nodes that transmit for a longer time because the estimation only accounts for the total number of baseband symbols that are received.

Once the channel covariance matrices have been estimated (either at block 325 or block 330), the covariance matrix estimator returns to the listening mode. Some embodiments of the covariance matrix estimator also delete entries corresponding to nodes that have not been active for a given time interval, e.g., because these notes have moved outside the coverage area of the base station for the MIMO array.

Figure 4:
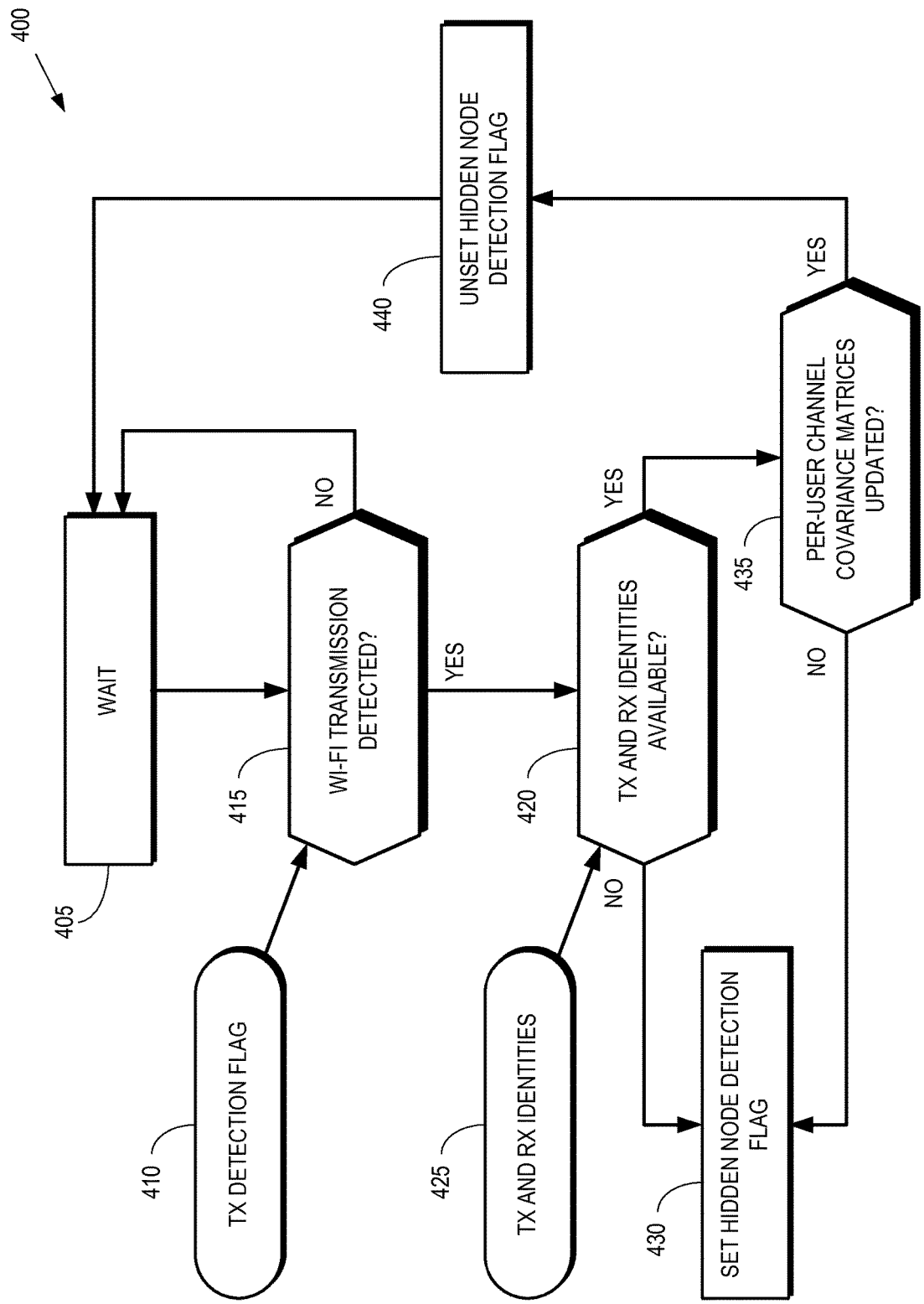
FIG. 4 is a flow diagram of a method of detecting hidden nodes according to some embodiments.

FIG. 4 is a flow diagram of a method 400 of detecting hidden nodes according to some embodiments. The method 400 is implemented in a base station for a MIMO array such as some embodiments of the base station 105 shown in FIG. 1 and the hidden node detector 220 in the base station 200 shown in FIG. 2. The hidden node detector determines whether identities of transmitting nodes and receiving nodes for an ongoing transmission are provided by an NLM such as the NLM 205 shown in FIG. 2. The hidden node also determines whether the estimated covariance matrices for the transmitting and receiving nodes are up-to-date using the method 400.

At block 405, the hidden node detector is waiting for a message to be received at the base station. Some embodiments of the hidden node detector receive indications of received messages from an NLM. For example, the NLM can provide a transmission detection flag 410 to the hidden node detector.

At decision block 415, the hidden node detector determines whether a message such as a Wi-Fi transmission has been detected by the base station. Some embodiments of the hidden node detector determine that a message has been detected based on a value of the transmission detection flag 410. A message has been detected if the transmission detection flag 410 has a first value (e.g., a value of 1) and no message has been detected if the transmission detection flag 410 has a second value (e.g., a value of 0). If no message has been detected, the method 400 flows back to block 405 and the hidden node detector waits for the next message to arrive. If the message is detected at decision block 415, the method 400 flows to decision block 420.

At decision block 420, the hidden node detector determines whether the message includes identifiers of the transmitting and receiving nodes using information 425 provided by the NLM. In some embodiments, the information 425 includes the MAC addresses of the transmitting or receiving nodes. If one or more of the identities of the transmitting and receiving nodes is not available, the method 400 flows to block 430. If identities of the transmitting node and the receiving node are available, the method 400 flows to decision block 435.

At block 430, the hidden node detector sets a hidden node detection flag. Some embodiments of the hidden node detector set the hidden node detection flag by setting a value of the flag to a value that indicates that the corresponding node is hidden, such as a value of 1, or otherwise activating the flag to indicate that there is a potential hidden node problem and to ensure coexistence with neighboring nodes that share the same channel of the unlicensed frequency band.

At decision block 435, the hidden node detector determines whether estimates of the covariance matrices of the identified transmitting node and receiving node are up-to-date. Some embodiments of the hidden node detector store a table that includes information identifying neighboring nodes to the base station and information indicating whether the estimates of the channel covariance matrices of the corresponding neighboring nodes are up-to-date. The hidden node detector uses the information stored in the table to determine whether the estimates of the channel covariance matrices are up-to-date. As discussed herein, an estimate of a channel covariance matrix is considered to be up-to-date if a sufficient number of samples has been acquired during a predetermined time interval. The specific number of samples that are required, as well as the expiration time of the samples or the up-to-date classification, are matters of design choice.

If the estimates of the channel covariance matrices of the transmitting node and the receiving node are out of date, the method 400 flows to block 430 and the hidden node detection flag is set. Identifying a hidden node problem using the activated hidden node detection flag ensures fair coexistence of the neighboring nodes because channel access is only attempted by performing the CCA operation when placement of accurate spatial nulls towards neighboring nodes, including the identified transmitting node and receiving node, is guaranteed by the availability of up-to-date channel covariance matrices for the neighboring nodes.

If the estimates of the channel covariance matrices of the transmitting node and the receiving node are up-to-date, the method 400 flows to block 440 and the hidden node detection flag is unset or deactivated. The method 400 then flows back to block 405 and the hidden node detector waits for the next message to arrive.

Figure 5:
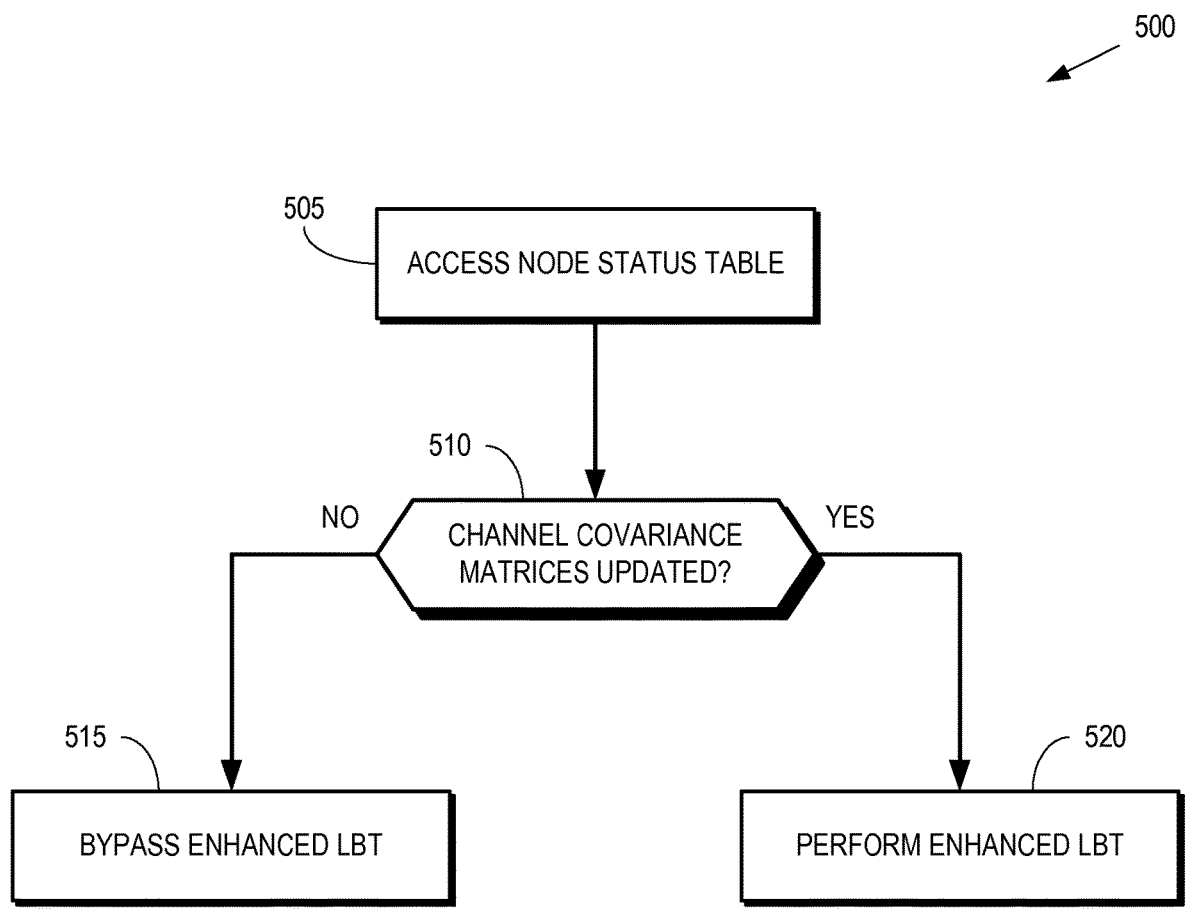
FIG. 5 is a flow diagram of a method of selectively performing a CCA operation based on the presence of hidden nodes according to some embodiments.

FIG. 5 is a flow diagram of a method 500 of selectively performing a CCA operation based on the presence of hidden nodes according to some embodiments. The method 500 is implemented in a base station for a MIMO array such as some embodiments of the base station 105 shown in FIG. 1 and the enhanced LBT module 230 in the base station 200 shown in FIG. 2.

At block 505, the enhanced LBT module accesses a node status table that includes a list of nodes in a neighborhood of a base station that implements the enhanced LBT module. The table also includes a status of the channel covariance matrices for the corresponding neighboring nodes. Some embodiments of the table include MAC identifiers of the nodes and a flag indicating whether the corresponding per-user channel covariance matrices are up-to-date.

At decision block 510, the enhanced LBT module determines whether the channel covariance matrices for the neighboring nodes are up-to-date. If at least one of the channel covariance matrices of a neighboring node is out of date, which indicates a potential hidden node problem, the method 500 flows to block 515 and the enhanced LBT module bypasses a CCA operation such as enhanced LBT using spatial nulls generated based on the channel covariance matrices. If all of the channel covariance matrices of the neighboring nodes are up-to-date, which indicates that no hidden nodes have been detected, the method 500 flows to block 520 and the enhanced LBT module performs the CCA operation such as the enhanced LBT using spatial nulls generated based on the up-to-date channel covariance matrices.

Figure 6:
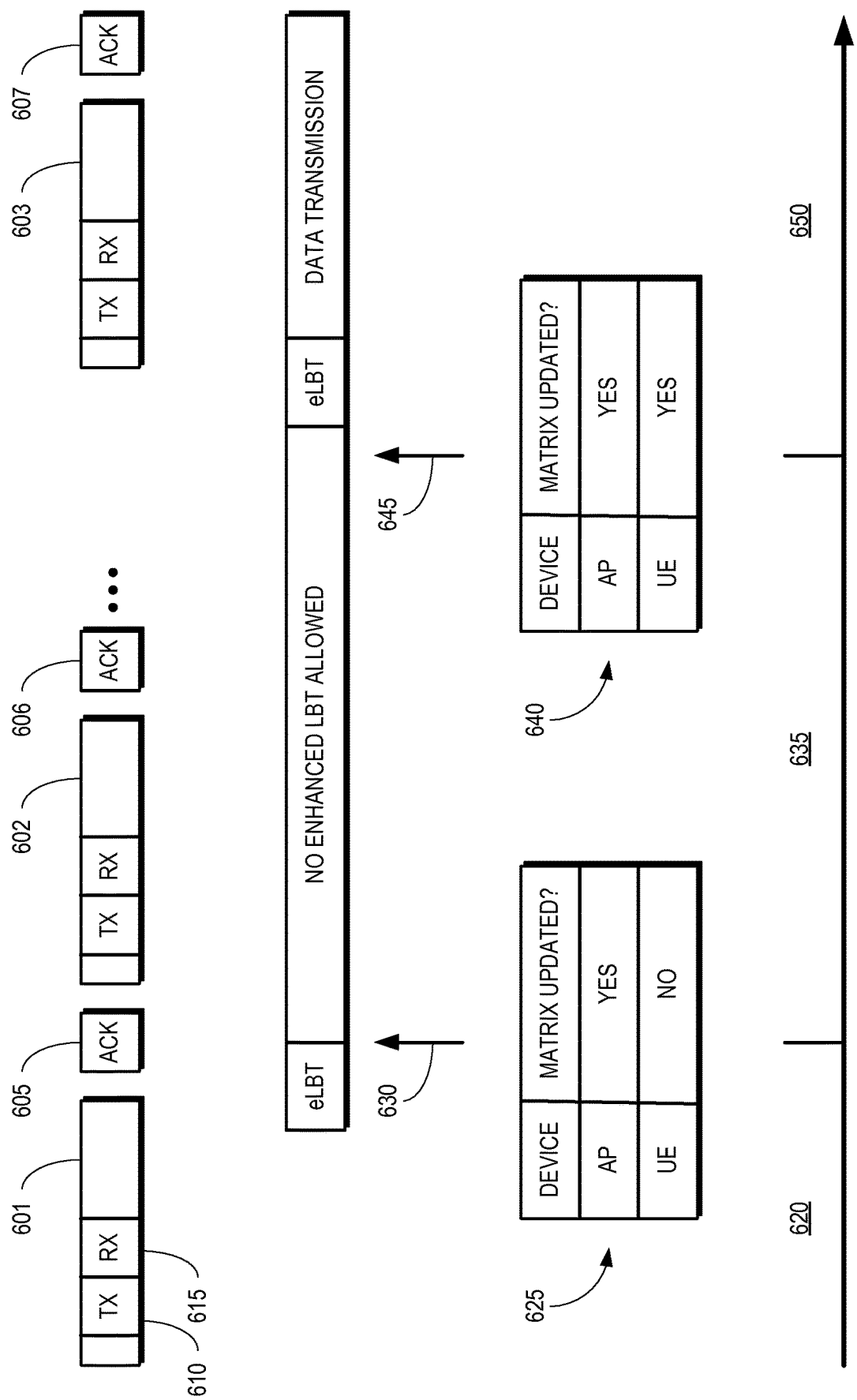
FIG. 6 is a block diagram that illustrates selectively performing a CCA operation such as enhanced listen-before-talk (LBT) based on identities of neighboring nodes according to some embodiments.

FIG. 6 is a block diagram that illustrates selectively performing a CCA operation such as enhanced LBT based on identities of neighboring nodes according to some embodiments. Selective performance of the CCA operation shown in FIG. 6 is implemented in some embodiments of the base station 105 shown in FIG. 1 and the base station 200 shown in FIG. 2. In the illustrated embodiment, a base station for a MIMO array shares one or more channels of an unlicensed frequency band with a Wi-Fi hotspot that includes an access point and a user equipment. Traffic from the access point is predominantly on the downlink from the access point towards the user equipment, e.g., video streaming.

The base station is connected to a MIMO array that is operating in a listening mode to listen to messages transmitted by one or more neighboring nodes. In the illustrated embodiment, the base station receives messages 601, 602, 603 from an access point such as a Wi-Fi access point that is providing downlink data transmissions to a user equipment. The base station also receives acknowledgment messages 605, 606, 607 that are transmitted by the user equipment in response to receiving the messages 601-603. The messages 601-603 transmitted by the access point include an address 610 of the transmitting node (e.g., the access point) and an address 615 of the receiving node (e.g., the user equipment).

During a first phase 620, the base station has identified the access point and the user equipment using the address is included in the message 601. The base station accesses information in table 625, which indicates that the per-user channel covariance matrix for the access point is up-to-date but the per-user channel covariance matrix for the user equipment is not up-to-date. For example, the per-user channel covariance matrix for the user equipment may be out of date due to an insufficient number of received baseband symbols, which prevents accurate estimation of the per-user channel covariance matrix, or expiration of a previously up-to-date estimate. A hidden node detection flag is activated, as indicated by the arrow 630.

A second phase 635 is initiated in response to activation of the hidden node detection flag. During the second phase 635, no enhanced LBT is allowed for clear channel assessment because the hidden node detection flag is active, which indicates that placing spatial nulls is not guaranteed to provide seamless coexistence with other technologies sharing the channel of the unlicensed frequency bands. Although channel access using enhanced LBT is not permitted during the second phase 635, channel access using conventional omnidirectional LBT is permitted during the second phase 635. The base station continues to receive the acknowledgment messages 605, 606 that are transmitted by the user equipment. The base station accumulates additional baseband symbols transmitted by the user equipment, which are used to improve estimates of the per-user channel covariance matrix of the user equipment. The hidden node detection flag is deactivated (as shown in the updated table 640) in response to the base station updating the per-user channel covariance matrix for the user equipment at arrow 645.

A third phase 650 is initiated in response to deactivation of the hidden node detection flag. The base station accurately places spatial nulls towards all coexisting nodes using the up-to-date per-user channel covariance matrices for the access point and the user equipment during the third phase 650. The base station is therefore able to use enhanced LBT to perform clear channel assessment and gain channel access for data transmission. Moreover, the access point operates according to enhanced LBT because the directions towards coexisting nodes have been detected and interference suppression is performed correctly using spatial nulls generated based on the per-user channel covariance matrices. In contrast, conventional LBT would be impacted by the hidden node problem due to the low traffic activity of the user equipment. The relative scarcity of the messages 605-607 makes it difficult to capture the messages 605-607 in a conventional listening mode and, even if the messages 605-607 were captured, spatial nulls are not guaranteed to be accurately placed in the direction of the user equipment due to the reduced importance of the channel eigendirections of the user equipment (e.g., in terms of the relative amplitudes of the singular values of the corresponding eigenmodes) in an aggregate covariance matrix.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
receiving, for a multiple-input, multiple-output (MIMO) array, a first message transmitted by a first node, the first message including information identifying the first node and a second node; and
selectively performing, based on whether there is access to first and second up-to-date channel covariance matrices for the first and second nodes, respectively, a clear channel assessment in an unlicensed frequency band concurrently with placing nulls in directions associated with the first and second nodes.

2. The method of claim 1, wherein selectively performing the clear channel assessment comprises performing a listen-before-talk (LBT) operation to attempt to gain access to a channel in the unlicensed frequency band.

3. The method of claim 1, wherein selectively performing the clear channel assessment comprises using the first and second up-to-date channel covariance matrices to place nulls in the directions associated with the first and second nodes concurrently with performing the clear channel assessment in response to the first and second up-to-date channel covariance matrices being available.

4. The method of claim 1, wherein selectively performing the clear channel assessment comprises bypassing placement of nulls in the directions associated with the first and second nodes in response to the first and second up-to-date channel covariance matrices not being available.

5. The method of claim 4, wherein selectively performing the clear channel assessment comprises performing an omnidirectional clear channel assessment.

6. The method of claim 4, further comprising:
receiving at least one second message transmitted by the second node subsequent to receiving the first message and during a first time interval of bypassing placement of nulls in the directions associated with the first and second nodes.

7. The method of claim 6, further comprising:
generating the first up-to-date channel covariance matrix based on the first message; and
generating the second up-to-date channel covariance matrix for the second node based on the at least one second message.

8. The method of claim 7, wherein generating the first up-to-date channel covariance matrix comprises aggregating symbols transmitted by the first node based on information in a header of the first message that identifies the first node as a transmitting node for the first message, and wherein generating the second up-to-date channel covariance matrix comprises aggregating symbols transmitted by the second node based on information in a header of the second message that identifies the second node as a transmitting node for the second message.

9. The method of claim 7, further comprising:
using the first and second up-to-date channel covariance matrices to place nulls in the directions associated with the first and second nodes concurrently with performing the clear channel assessment in a second time interval that is subsequent to the first time interval.

10. A base station for a multiple-input, multiple-output (MIMO) array, the base station comprising:
a transceiver configured to receive a first message transmitted by a first node, the first message including information identifying the first node and a second node; and
a processor configured to selectively perform, based on whether the base station has access to first and second up-to-date channel covariance matrices for the first and second nodes, respectively, a clear channel assessment in an unlicensed frequency band concurrently with placing nulls in directions associated with the first and second nodes.

11. The base station of claim 10, further comprising:
a listen-before-talk (LBT) module configured to perform an LBT operation to attempt to gain access to a channel in the unlicensed frequency band.

12. The base station of claim 10, wherein the processor is configured to use the first and second up-to-date channel covariance matrices to place nulls in the directions associated with the first and second nodes concurrently with performing the clear channel assessment in response to the first and second up-to-date channel covariance matrices being available to the base station.

13. The base station of claim 10, wherein the processor is configured to bypass placement of nulls in the directions associated with the first and second nodes in response to the first and second up-to-date channel covariance matrices not being available to the base station.

14. The base station of claim 13, wherein the processor is configured to perform an omnidirectional clear channel assessment.

15. The base station of claim 13, wherein the transceiver is configured to receive at least one second message transmitted by the second node subsequent to receiving the first message and during a first time interval in which the base station is bypassing placement of nulls in the directions associated with the first and second nodes.

16. The base station of claim 15, wherein the processor is configured to:
  generate the first up-to-date channel covariance matrix based on the first message; and
  generate the second up-to-date channel covariance matrix for the second node based on the at least one second message.

17. The base station of claim 16, wherein the processor is configured to aggregate symbols transmitted by the first node based on information in a header of the first message that identifies the first node as a transmitting node for the first message, and wherein the processor is configured to aggregate symbols transmitted by the second node based on information in a header of the second message that identifies the second node as a transmitting node for the second message.

18. The base station of claim 16, wherein the processor is configured to use the first and second up-to-date channel covariance matrices to place nulls in the directions associated with the first and second nodes concurrently with performing the clear channel assessment in a second time interval that is subsequent to the first time interval.

19. A method comprising:
  performing, for a multiple-input, multiple-output (MIMO) array, a clear channel assessment in an unlicensed frequency band concurrently with placing nulls in directions associated with neighboring nodes in response to per-user covariance matrices being available for the neighboring nodes; and
  performing, an omnidirectional clear channel assessment in the unlicensed frequency band in response to at least one of the per-user covariance matrices being unavailable for at least one of the neighboring nodes.

20. The method of claim 19, further comprising:
  separately aggregating symbols transmitted by the neighboring nodes based on identifiers of transmitting nodes included in headers of messages received from the neighboring nodes.

* * * * *